US008879413B2

(12) United States Patent
Zhi et al.

(10) Patent No.: US 8,879,413 B2
(45) Date of Patent: Nov. 4, 2014

(54) METHOD AND SYSTEM FOR CONTROLLING ACCESS OF MACHINE TYPE COMMUNICATIONS DEVICES

(75) Inventors: Chunxia Zhi, Shenzhen (CN); Hao Wu, Shenzhen (CN); Zhijun Li, Shenzhen (CN); Lanlan Li, Shenzhen (CN); Baoguo Xie, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 100 days.

(21) Appl. No.: 13/695,138

(22) PCT Filed: Apr. 25, 2011

(86) PCT No.: PCT/CN2011/073278
§ 371 (c)(1),
(2), (4) Date: Oct. 29, 2012

(87) PCT Pub. No.: WO2011/134378
PCT Pub. Date: Nov. 3, 2011

(65) Prior Publication Data
US 2013/0044596 A1 Feb. 21, 2013

(30) Foreign Application Priority Data
Apr. 30, 2010 (CN) .......................... 2010 1 0165419

(51) Int. Cl.
H04J 1/16 (2006.01)
H04W 4/00 (2009.01)
(52) U.S. Cl.
USPC .......................................... 370/252; 370/328
(58) Field of Classification Search
USPC ........................................ 370/252, 328, 401
See application file for complete search history.

(56) References Cited

U.S. PATENT DOCUMENTS

2011/0201344 A1* 8/2011 Ryu et al. ....................... 455/450
2011/0274040 A1* 11/2011 Pani et al. ....................... 370/328
2011/0280199 A1* 11/2011 Widell et al. ................. 370/329

(Continued)

FOREIGN PATENT DOCUMENTS

| CN | 1859248 A | 11/2006 |
| CN | 101427532 A | 5/2009 |
| CN | 101669389 A | 3/2010 |
| CN | 101969635 A | 2/2011 |

OTHER PUBLICATIONS

International Search Report for PCT/CN2011/073278 dated May 31, 2011.

Primary Examiner — Andrew Lee
(74) Attorney, Agent, or Firm — Ling Wu; Stephen Yang; Ling and Yang Intellectual Property LLC

(57) ABSTRACT

A method for controlling access of machine type communications device is provided by the present invention. The method includes: configuring an access priority to a machine type communications device; a network side configuring a corresponding access control parameter for an access priority needing an access control according to the current network load information, and sending the access priority needing the access control and the access control parameter to the machine type communications device; and according to an access priority of the machine type communications device and the received the access priority needing the access control and the access control parameter, the machine type communications device judging whether an access request can be initiated. A system for controlling access of the machine type communications device is also provided by the present invention.

18 Claims, 6 Drawing Sheets

(56) References Cited

U.S. PATENT DOCUMENTS

2012/0082103 A1\* 4/2012 Lin et al. ............... 370/329
2013/0051228 A1\* 2/2013 Kim et al. .............. 370/230
2013/0088956 A1\* 4/2013 Zhou et al. ............. 370/230
2014/0075503 A1\* 3/2014 Kopplin ................. 726/1

\* cited by examiner

METHOD AND SYSTEM FOR CONTROLLING ACCESS OF MACHINE TYPE COMMUNICATIONS DEVICES

TECHNICAL FIELD

The present invention relates to the field of communications, and particularly, to a method and system for controlling access of machine communications.

BACKGROUND OF THE RELATED ART

With the development of the mobile network service and automation control technology, a machine type communication mode also called a Machine To Machine (M2M) communication mode appears, and in the communication mode, at least one party participating in the communications is a machine device.

In a narrow sense, a definition of M2M is the communications from machine to machine, but in a broad sense, the M2M includes networking applications and services which are centered on machine terminal intelligent interaction. The M2M can provide informationized solutions for clients based on intelligent machine terminals and using various communication modes as access methods, which are used for satisfying informatization demands of users on monitoring, command scheduling, data acquisition and measurements and so on. The M2M can be applied to industry applications (such as traffic monitoring, alarm system, maritime rescue, vending machine and pay-for-drive and so on), family applications (such as automatic meter reading and temperature control and so on) and personal applications (such as life detection and remote diagnosis and so on), etc.

A communication object of the M2M is a machine, and a communication behavior is in automation control, that is, initiation and termination of the communication and the control on certain admissions and restrictions in the communication process are all automatic behaviors. This kind of behavior relies on the restriction and control on the machine (i.e. a terminal in M2M communication) behaviors in the M2M communication, and the behaviors of the terminal in M2M communication are restricted by service subscription data, and a network manages the terminal in M2M communication according to the service subscription data.

The most typical communication mode in machine type communication is communication between a terminal and an application server, and the terminal is called as a Machine Type Communications device (called as an MTC device for short) or an MTC UE, and the application server is called as an MTC Server.

In the 2G/3G/LTE access, a Packet Service (PS) network is mainly used as a bottom layer bearer network in the M2M communication, which implements service layer communications between the MTC device and MTC server. FIG. 1 is a schematic diagram of architecture of an M2M communication entity accessing an Evolved Packet System (EPS) according to the related art. As shown in FIG. 1, the bottom layer bearer network includes: an Evolved Universal Terrestrial Radio Access Network (E-UTRAN), a Mobility Management Entity (MME), a Serving Gateway (S-GW or SGW), a Packet Data Network Gateway (PDN GW, P-GW, or PGW), a Home Subscriber Server (HSS) and a Policy and Charging Rules Function (PCRF). Wherein, a major network element of the E-UTRAN is an Evolved NodeB (eNodeB).

In FIG. 1, the MME takes charge of works such as mobility management, non-access layer signaling processing and context management in user mobility management and so on related to a control plane; the S-GW is an access gateway device connected with the E-UTRAN, which takes charge of forwarding data between the E-UTRAN and P-GW and caching the paging waiting data; the P-GW is a border gateway of the EPS and a Packet Data Network (PDN), which takes charge of functions such as access of the PDN and data forwarding between the EPS and PDN and so on; and the PCRF is a policy and charging rules function entity, which is connected with an Internet Protocol (IP) service network of operators through a receiving interface Rx to acquire service information. Moreover, the PCRF also can be connected with a gateway device in the network through a Gx interface, which takes charge of initiating IP bearer establishment and guarantees the Quality of Service (QoS) of service data, and performs charging control. The HSS is used to provide the managements of subscription data of the users and the management of important context information accessed by the users to the network.

In addition, the MTC Server can play the role of an Application Function (AF), which is connected with the PCRF through the Rx interface so as to implement control on the bearer. Moreover, the MTC Server can play the role of a Session Initiation Protocol Application Server (SIP AS), which is connected with the HSS through a Sh interface so as to access application service data.

In FIG. 1, the MTC UE accesses an EPS network through the E-UTRAN (eNodeB), after an IP address is allocated to the MTC UE, an IP tunnel can be established between the MTC UE and MTC Server, thereby implementing upper layer service communications between the MTC UE and MTC Server. The IP tunnel established between the MTC UE and MTC Server is a logical IP tunnel of which a physical path goes through: eNodeB, S-GW, P-GW.

Currently, one way to implement the M2M communication is to establish one service layer interface protocol on the IP tunnel between the MTC UE and MTC Server, and the service data interaction is performed between the MTC UE and MTC Server through the service layer interface protocol. Meanwhile, the MTC Server also implements control on the MTC UE through the service layer interface protocol.

Through an IP connection between the MTC UE and MTC Server, data communication between the MTC UE and MTC Server can be implemented, but MTC monitoring demands that, the MTC Server needs to monitor a running state of the MTC UE and acquire the current state of the MTC UE timely and dynamically, and when the current state of the MTC UE is changed, MTC Server needs to obtain a timely notification, are extremely difficult to be implemented on the IP connection. These state changes of the MTC UE may include: the MTC UE detaching from the network, the MTC UE entering into a disconnected state, the MTC UE releasing a wireless connection and the current position of the MTC UE being changed and so on. These state changes of the MTC UE can be called as one MTC event. Generally, which MTC events are required to be monitored can be defined in MTC subscription data of Home Location Register/Home Subscriber Server (HLR/HSS) and sent by the HLR/HSS to Serving GPRS Support Node (SGSN)/MME through the procedure of the MTC UE attaching to the network. However, with regard to the detection of the MTC events, network entities of a core network is generally required to perform the detection, e.g. in the EPS network, network elements which are responsible for detecting the MTC events can be MME/SGW/PGW and so on, and in a General Packet Radio Service (GPRS) network, network elements which are responsible for detecting the MTC events can be SGSN/Gateway GPRS Support Node (GGSN) and so on. After the MTC events are detected, it is generally required to make a report to the MTC Server so that the MTC Server can acquire the running condition of the MTC UE in time.

After network congestion occurs, the MME can refuse an access request to a certain MTC device group or a certain Access Point Name (APN).

In a network attachment process, the MME obtains a group identifier to which the MTC device belongs through the HSS. When receiving access requests of the MTC device, the MME can refuse those access requests of the MTC device which belongs to a group causing the congestion according to the current congestion condition and the group identifier to which the MTC device belongs. In addition, the MTC device also can include the group identifier in an access request message so that the MME can make a fast judgment on the access requests.

The MME provide back off time in a rejection message, and the MTC device which is refused to access needs to wait for a period of time (a duration indicated by the back off time) and then initiate the access requests again. The specific flow is as shown in FIG. 2, and the following steps are included.

In step 201, an MTC device sends an access request message to an MME, and the access request message can include a group identifier to which the MTC device belongs.

In step 202, the MME decides whether to permit the access of the MTC device according to the current network load condition and the group identifier to which the MTC device belongs.

In step 203, the MME sends an access request acceptance message or an access request rejection message to the MTC device. A back off time parameter is included in the access request rejection message to indicate a waiting duration.

With the above method, not only a large quantity of network signaling resources are occupied, but also user experience is reduced when using the services.

SUMMARY OF THE INVENTION

The object of the present invention is to provide a method and system for controlling access of machine communications, to reduce network congestion and optimize network resource usage.

In order to solve the technical problem, the present invention provides a method for controlling access of machine communications, which comprises:

configuring an access priority for a machine type communications device;

a network side configuring an access control parameter for an access priority needing an access control according to current network load information, and sending the access priority needing the access control and the access control parameter to the machine type communications device; and according to the access priority of the machine type communications device and the received access priority needing the access control and the access control parameter, the machine type communications device judging whether an access request can be initiated.

The step of configuring an access priority for a machine type communications device can comprise: configuring the access priority of the machine type communications device in the machine type communications device locally.

When the access priority is configured for the machine type communications device, configurations can be made according to differences of the machine type communications device, a machine type communications device group or a machine type communications service type.

The access priority needing the access control can comprise an access priority needing access prohibition and/or an access priority needing access delay.

The access control parameter can comprise one or a combination of the following information: access probability, waiting time and access permitted or not.

The network side can comprise a mobility management entity and an eNB;

the step of a network side configuring an access control parameter for an access priority needing an access control according to current network load information can comprise:

the mobility management entity configuring the access control parameter of the access priority needing the access control according to the current network load information and a network policy, and sending the access priority needing the access control and/or the access control parameter to the eNB; or, the mobility management entity sending the current network load information to the eNB, and the eNB configuring the access control parameter of the access priority needing the access control according to the current network load information and the network policy.

The current network load information can be current service load information;

the method can further comprise: a serving gateway sending the current service load information to the mobility management entity, wherein, the serving gateway generates the current service load information according to a local service load condition, or generates the current service load information according to the local service load condition and a service load condition acquired from a packet data network gateway.

The access priority needing the access control and the access control parameter can be sent to the machine type communications device through a broadcast message.

The access priority needing the access control and the access control parameter can be carried through a system information block 2 or a newly added system information block in the broadcast message.

The present invention further provides a method for controlling access of machine communications, which comprises:

configuring an access priority for a machine type communications device; and when receiving an access request of the machine type communications device, a network side network element performing access control on the machine type communications device according to the access priority of the machine type communications device and current network load information.

The network side network element can be a mobility management entity; the method can further comprise: the mobility management entity acquiring the access priority of the machine type communications device from subscription information of the machine type communications device, or, the access request including the access priority of the machine type communications device, and the mobility management entity acquiring the access priority of the machine type communications device from the access request.

The network side network element can be an eNB, and the access request can include the access priority of the machine type communications device; the method can further comprise: the eNB acquiring the access priority of the machine type communications device from the access request, and acquiring the current network load information from the mobility management entity.

The step of a network side network element performing access control on the machine type communications device according to the access priority of the machine type communications device and current network load information can comprise: the network side network element configuring an access control parameter for an access priority needing an access control according to the current network load information; and when receiving the access request, performing access control on the machine type communications device according to the access control parameter and the access priority of the machine type communications device.

When the access priority is configured for the machine type communications device, configurations can be made according to differences of the machine type communications device, a machine type communications device group or a machine type communications service type.

The present invention further provides a system for controlling access of machine communications, which comprises: a machine type communications device and a network side, wherein:

the machine type communications device is configured to: after receiving an access priority needing an access control and an access control parameter corresponding to the access priority needing the access control sent by the network side, judge whether an access request can be initiated according to an access priority of the machine type communications device;

the network side is configured to: configure the corresponding access control parameter for the access priority needing the access control according to current network load information, and send the access priority needing the access control and the access control parameter to the machine type communications device.

The access priority of the machine type communications device can be configured according to differences of the machine type communications device, a machine type communications device group or a machine type communications service type.

The access priority needing the access control can comprise an access priority needing access prohibition and/or an access priority needing access delay.

The network side can comprise a mobility management entity and an eNB; wherein:

the mobility management entity can be configured to: configure the access control parameter corresponding to the access priority needing the access control according to the current network load information and a network policy, and send the access priority needing the access control and/or the access control parameter to the eNB; or, the mobility management entity can be configured to: send the current network load information to the eNB; the eNB can be configured to: according to the current network load information and the network policy, configure the access control parameter corresponding to the access priority needing the access control.

The current network load information can be current service load information;

the mobility management entity can be further configured to: acquire the current service load information from a serving gateway, wherein, the current service load information is generated by the serving gateway according to a local service load condition, or is generated by the serving gateway according to the local service load condition and a service load condition acquired from a packet data network gateway.

The network side can be configured to: send the access priority needing the access control and the access control parameter to the machine type communications device through a broadcast message.

The network side can be configured to: carry the access priority needing the access control and the access control parameter through a system information block 2 or a newly added system information block in the broadcast message.

The present invention further provides a network side network element, which is configured to: when receiving an access request of a machine type communications device, perform access control on the machine type communications device according to an access priority of the machine type communications device and current network load information.

The network side network element can be a mobility management entity; the mobility management entity can be further configured to: acquire the access priority of the machine type communications device from subscription information of the machine type communications device, or acquire the access priority of the machine type communications device from the access request.

The network side network element can be an eNB; the eNB can be further configured to: acquire the access priority of the machine type communications device from the access request, and acquire the current network load information from the mobility management entity.

The network side network element can be further configured to: configure an access control parameter for an access priority needing an access control according to the current network load information;

the network side network element can be configured to: when receiving the access request, perform access control on the machine type communications device according to the access control parameter and the access priority of the machine type communications device.

In the method of the present invention, the MTC device decides whether the access request can be initiated according to an indication of the received access control parameter, which can reduce unnecessary control signaling interaction between the MTC device and the network side effectively and save network resources. Meanwhile, a method for dividing the access priority is introduced, which can simplify the process of a network node deciding the access control, and reduce the amount of information required to be transmitted in a control signaling message to a certain degree.

PREFERRED EMBODIMENTS OF THE PRESENT INVENTION

Figure 1:
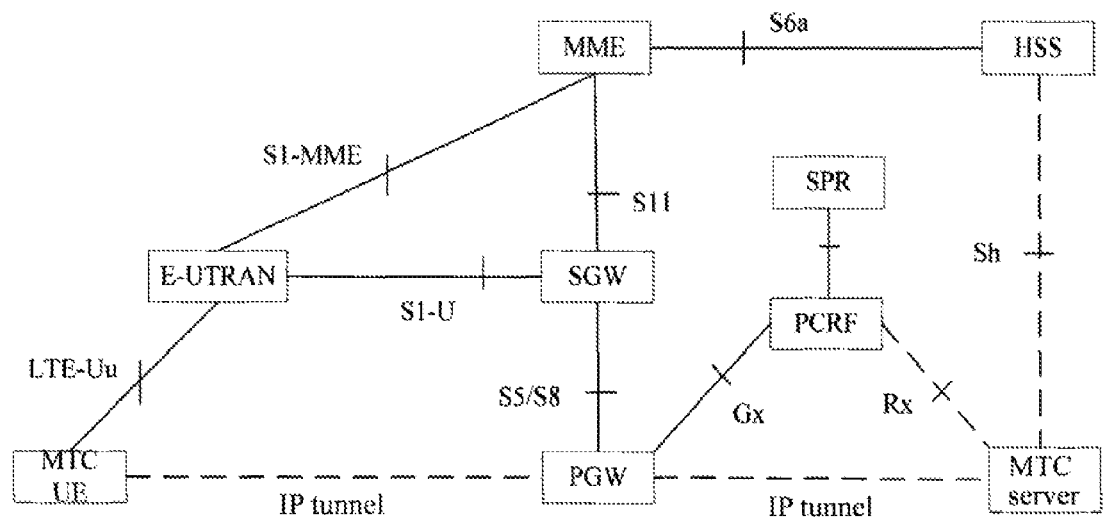
FIG. 1 is a diagram of M2M network architecture.
Figure 2:
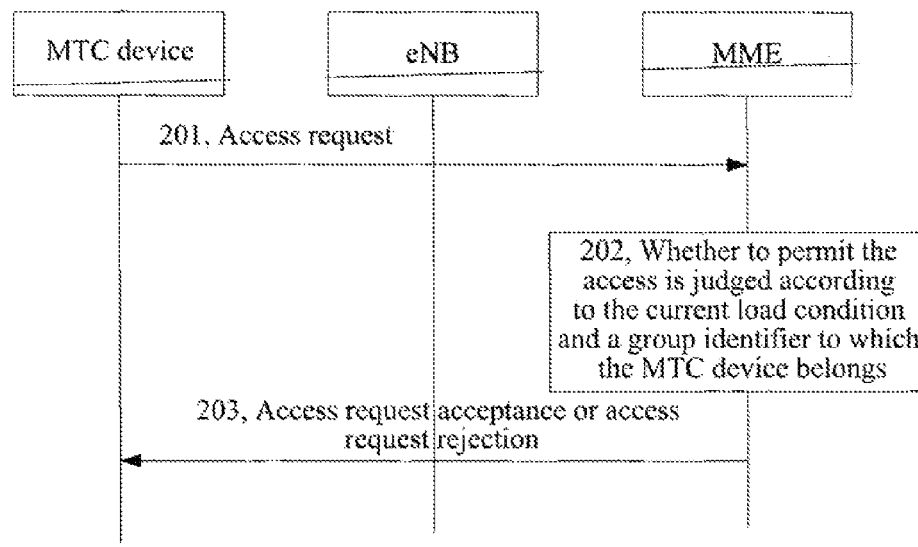
FIG. 2 is an access process of MTC device according to the related art.

The reason for an occurrence of network congestion is mainly that processing capacity of a network node reaches the limit and no idle resources can be used. In M2M communication, since a large number of MTC devices exists in the network, if the MTC devices initiate access requests or use the same service simultaneously in a short time, it will cause the processing capacity of the network node to reach the limit.

In the present invention, according to the above communication characteristic of M2M, a network side allocates different access priorities to an MTC device, an MTC device group or an MTC service type, and according to the current network load condition, a network policy and the access priorities, corresponding access control parameters are configured, thereby implementing access control on the MTC device. The specific network policy can be: the network side setting different load thresholds (lower than a limit value) for the different access priorities, and when the network load reaches a preset threshold, performing access control on the MTC device with the corresponding access priority.

Method 1

The present invention provides a method for controlling access of machine communications, which includes:

configuring an access priority for a machine type communications device; a network side configuring a corresponding access control parameter for an access priority needing an access control according to the current network load information, and sending the access priority needing the access control and the corresponding access control parameter to the machine type communications device; and according to the access priority of the machine type communications device and the received access priority needing the access control and the corresponding access control parameter, the machine type communications device judging whether an access request can be initiated.

Wherein, the step of configuring an access priority for a machine type communications device comprises: configuring the access priority of the machine type communications device in the machine type communications device locally.

Wherein, when configuring the access control parameter corresponding to the access priority needing the access control, the network side only configures corresponding access control parameters for an access priority needing access prohibition and/or an access priority needing access delay.

Wherein, the current network load information is current service load information; the method further comprises: a serving gateway sending the current service load information to a mobility management entity, wherein, the serving gateway generates the current service load information according to a local service load condition, or generates the current service load information according to the local service load condition and a service load condition acquired from a packet data network gateway.

In the above method, the access control parameters set by the network can be: access probability, waiting time and access permitted or not and so on, which can be configured according to the following structures:

access probability: percentage (%), wherein, a value range of the access probability is between 0~100;

waiting time: second/minute, a time granularity selection, a fixed value or a random number controlled according to congestion.

access permitted or not: yes or no.

The above access control parameters can be flexibly selected in practical configurations, one or any combination of the access control parameters can be configured, but it is not only limited to using these parameters, the network side also can define other parameters.

The method for sending the access priority and the access control parameter through a broadcast message includes:

a) expanding a System Information Block 2 (SIB2) in the existing system broadcast message, wherein, an AC indication parameter is added in the system message and used to indicate that an AC is a dedicated AC of the MTC device. Meanwhile, the access priority of the MTC device and the corresponding access control parameter (such as an indication of access permitted or not and the waiting time and so on) are added.

b) adding a new SIB in the existing system broadcast message, which is specially used to send the access priority of the MTC device and the access control parameter.

A method for sending the access priority and the access control parameter through the broadcast message is not limited to the above method. The access priority and the access control parameter also can be sent without the broadcast message, e.g. the access priority and the access control parameter can be sent to the MTC device through a control signaling.

An implementation method is: the network side allocating the access priorities to the MTC device, the MTC device group or the MTC service type respectively according to a policy of the network side or service demands of MTC users, and pre-configuring the access priorities in the MTC device. When the network load reaches the predefined threshold, an MME or an eNB configures the corresponding access control parameter for the access priority needing the access control according to the current load condition, and sends the access priority needing the access control and the corresponding access control parameter to the MTC device through the broadcast message. Before initiating an access request flow, according to the access priority and the corresponding access control parameter acquired from the broadcast message, the MTC device decides whether the access can be initiated or whether the access should be initiated after waiting for a period of time.

Method 2

The present invention also provides a method for controlling access of machine communications, which includes: configuring an access priority for a machine type communications device; and when receiving an access request of the machine type communications device, a network side network element performing access control on the machine type communications device according to the access priority of the machine type communications device and the current network load information.

Wherein, the network side network element is a mobility management entity, and the mobility management entity acquires the access priority of the machine type communications device from subscription information of the machine type communications device, or, the access request includes the access priority of the machine type communications device, and the mobility management entity acquires the access priority of the machine type communications device from the access request.

Wherein, the network side network element is an eNB, the access request includes the access priority of the machine type communications device, and the eNB acquires the access priority of the machine type communications device from the access request, and acquires the current network load information from the mobility management entity.

Wherein, the network side network element also configures an access control parameter for an access priority needing an access control according to the current network load, and when receiving the access request, the network side performs access control on the machine type communications device according to the access control parameter and the access priority of the machine type communications device.

Specific information contained in the access control parameter can refer to the access control parameters mentioned in the above method 1.

EXAMPLE 1

Figure 3:
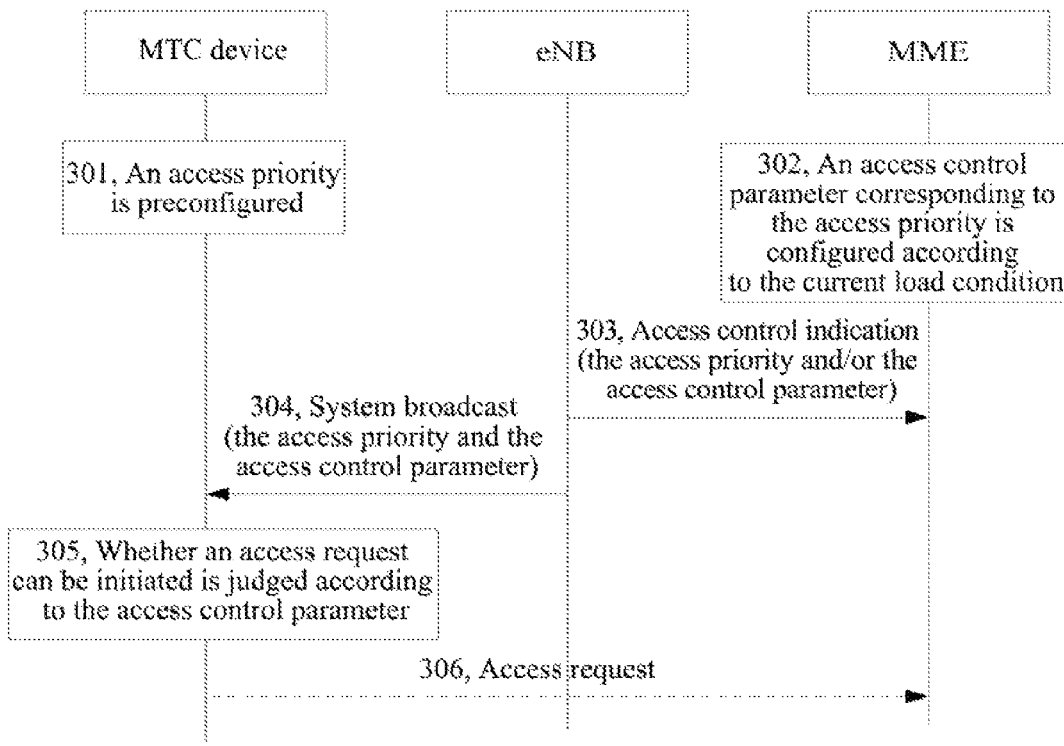
FIG. 3 is a flow diagram according to the example 1 of the present invention.

An MME configures access control parameters, and the specific flow is as shown in FIG. 3, which includes the following steps.

In step 301, an access priority is preconfigured in an MTC device.

In step 302, according to the current network load condition and a network policy, the MME decides to prohibit or delay access of MTC devices with certain access priorities, and configures the corresponding access control parameters.

In step 303, the MME sends an access control indication to an eNB, and the access control indication includes the access priorities required to be prohibited or delayed and/or the corresponding access control parameters.

In step 304, the eNB sends the access priorities required to be prohibited or delayed and the corresponding access control parameters to the MTC device through a broadcast message.

In step 305, according to the received access priorities and access control parameters, the MTC device judges whether an access request can be initiated or whether the access request should be initiated after waiting for a period of time.

In step 306, an MTC device whose access priority is not included in the broadcast message or an MTC device which has been waiting for a period of time can send an access request message to the MME.

EXAMPLE 2

Figure 4:
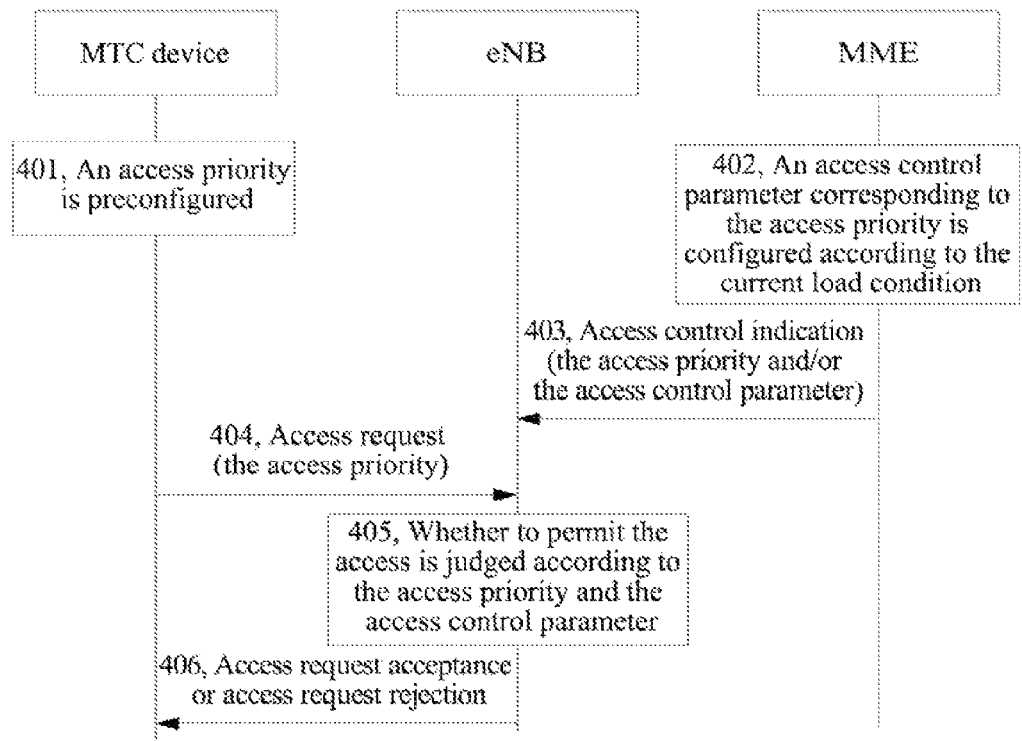
FIG. 4 is a flow diagram according to the example 2 of the present invention.

An MME configures access control parameters, and an eNB performs access control, and the specific flow is as shown in FIG. 4, which includes the following steps.

In step 401, an access priority is preconfigured in an MTC device.

In step 402, according to the current network load condition and a network policy, the MME decides to prohibit or delay access of MTC devices with certain access priorities, and configures the corresponding access control parameters.

In step 403, the MME sends an access control indication to the eNB, the access control indication includes the access priorities required to be prohibited or delayed and/or the corresponding access control parameters, and the eNB saves the received access priorities and/or the corresponding access control parameters.

In step 404, the MTC device sends an access request to the eNB, and the access request includes information of the access priority of the MTC device.

In step 405, after receiving the access priority of the MTC device, according to the saved access priorities required to be prohibited or delayed and the corresponding access control parameters, the eNB judges whether access of the MTC device is permitted.

In step 406, the eNB sends an access request acceptance message or an access request rejection message to the MTC device, and a waiting duration can be included in the access request rejection message.

EXAMPLE 3

Figure 5:
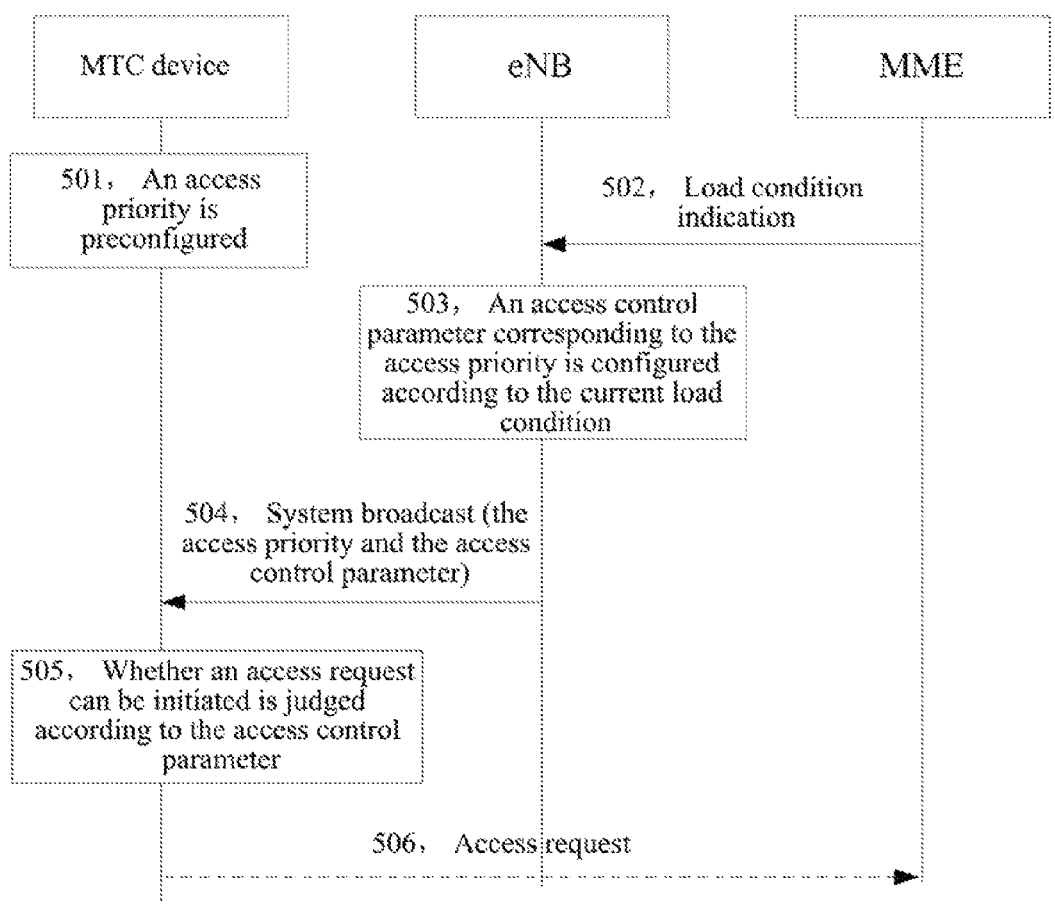
FIG. 5 is a flow diagram according to the example 3 of the present invention.

An eNB configures access control parameters, and the specific flow is as shown in FIG. 5, which includes the following steps.

In step 501, an access priority is preconfigured in an MTC device.

In step 502, an MME sends a load condition indication (an overload indication or an actual load value) to the eNB.

When the network load reaches a preset threshold, the load condition indication can be sent or be sent periodically, and the specific implementation is not limited to these two methods.

In step 503, according to the load condition indication sent by the MME and a network policy, the eNB decides to prohibit or delay access of MTC devices with certain access priorities, and configures the corresponding access control parameters.

In step 504, the eNB sends the access priorities required to be prohibited or delayed and the corresponding access control parameters to the MTC device through a broadcast message.

In step 505, according to the received access priorities and corresponding access control parameters, the MTC device judges whether an access request can be initiated or whether the access request should be initiated after waiting for a period of time.

In step 506, an MTC device whose access priority is not included in the broadcast message or an MTC device which has been waiting for a period of time can send an access request message to the MME.

Certainly, with reference to the example 2, after configuring the access control parameters, the eNB doesn't need to send the access priorities and corresponding access control parameters to MTC device through the broadcast message, but when receiving the access request of the MTC device, it judges whether access of the MTC device is permitted, and sends an access request acceptance message or an access request rejection message to the MTC device.

EXAMPLE 4

Figure 6:
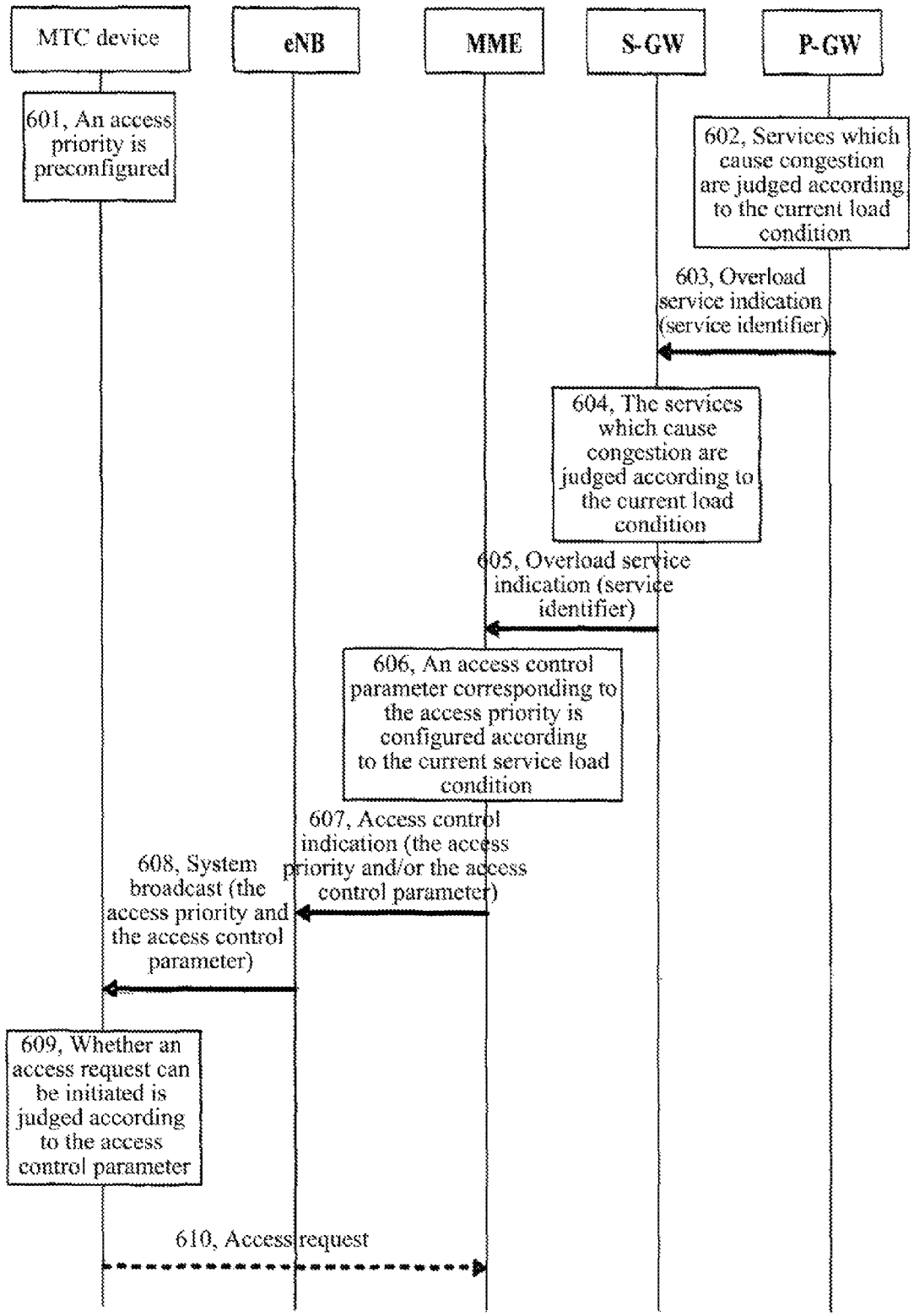
FIG. 6 is a flow diagram according to the example 4 of the present invention.

Access priorities are divided according to services, and an MME collects service load information and configures access control parameters according to the service load information, and the specific flow is as shown in FIG. 6, which includes the following steps.

In step 601, an access priority is preconfigured in an MTC device.

In step 602, a P-GW determines which services cause the network congestion according to the current service load condition.

In step 603, the P-GW sends an overload service indication to an S-GW, and service identifier information which causes the network congestion can be included in the message.

In step 604, the S-GW determines which services cause the network congestion according to the current service load condition.

In step 605, the S-GW sends the overload service indication to the MME, and the service identifier information (including the information sent by the P-GW) which causes the network congestion can be included in the message.

In step 606, according to the current network service load condition and a network policy, the MME decides to prohibit or delay access of MTC devices with certain access priorities, and configures the corresponding access control parameters.

In step 607, the MME sends an access control indication to an eNB, and the access priorities required to be prohibited or delayed and/or the corresponding access control parameters are included in the message.

In step 608, the eNB sends the received access priorities and corresponding access control parameters to the MTC device through a broadcast message.

In step 609, according to the received access priorities and corresponding access control parameters, the MTC device judges whether an access request can be initiated or whether the access request should be initiated after waiting for a period of time.

In step 610, an MTC device whose access priority is not included in the broadcast message or an MTC device which has been waiting for a period of time can send an access request message to the MME.

The service identifier information in the above flow can be an APN or any other information which can be used to distinguish the services.

Wherein, the example 4 can be transformed as follows, after receiving the access priorities and/or access control parameters, the eNB doesn't need to send the access priorities required to be prohibited or delayed and the corresponding access control parameters to the MTC device through the broadcast message, but when receiving the access request of the MTC device, it judges whether access of the MTC device is permitted, and sends an access request acceptance message or an access request rejection message to the MTC device.

EXAMPLE 5

Figure 7:
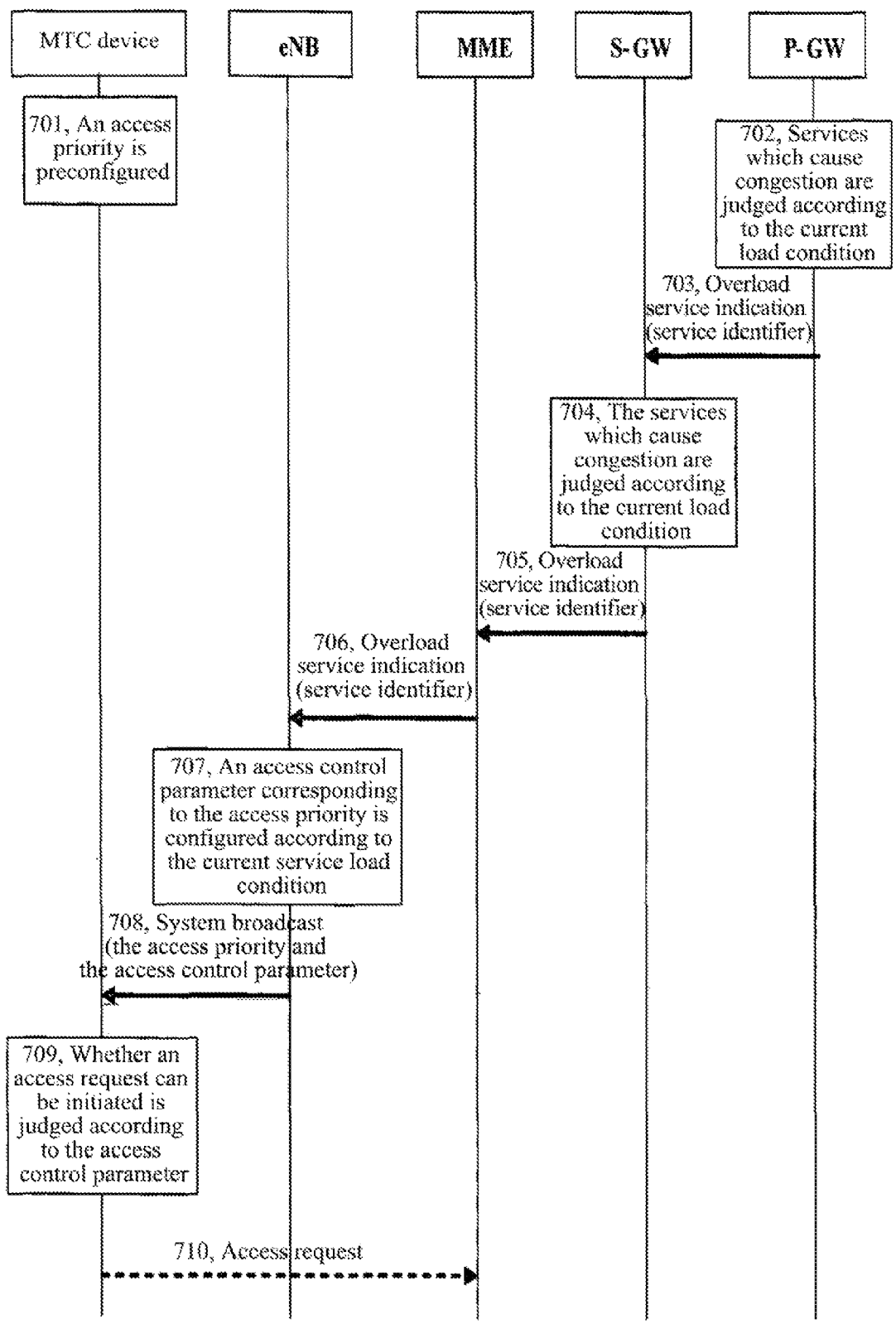
FIG. 7 is a flow diagram according to the example 5 of the present invention.

Access priorities are divided according to services, and an eNB collects service load information and configures access control parameters according to the service load information, and the specific flow is as shown in FIG. 7, which includes the following steps.

In step 701, an access priority is preconfigured in an MTC device.

In step 702, a P-GW determines which services cause the network congestion according to the current service load condition.

In step 703, the P-GW sends an overload service indication to an S-GW, and service identifier information which causes the network congestion can be included in the message.

In step 704, the S-GW determines which services cause the network congestion according to the current service load condition.

In step 705, the S-GW sends the overload service indication to an MME, and the service identifier information (including the information sent by the P-GW) which causes the network congestion can be included in the message.

In step 706, the MME sends the overload service indication to the eNB, and the service identifier information which causes the network congestion is included in the message.

In step 707, according to the current network service load condition and a network policy, the eNB decides to prohibit or delay access of MTC devices with certain access priorities, and configures the corresponding access control parameters.

In step 708, the eNB sends the access priorities required to be prohibited or delayed and the corresponding access control parameters to the MTC device through a broadcast message.

In step 709, according to the received access priorities and corresponding access control parameters, the MTC device judges whether an access request can be initiated or whether the access request should be initiated after waiting for a period of time.

In step 710, an MTC device whose access priority is not included in the broadcast message or an MTC device which has been waiting for a period of time can send an access request message to the MME.

The service identifier information in the above flow can be an APN or any other information which can be used to distinguish the services.

Wherein, the example 5 can be transformed as follows, after configuring the access control parameters, the eNB doesn't need to send the access priorities and corresponding access control parameters to the MTC device through the broadcast message, but when receiving the access request of the MTC device, it judges whether access of the MTC device is permitted, and sends an access request acceptance message or an access request rejection message to the MTC device.

EXAMPLE 6

Figure 8:
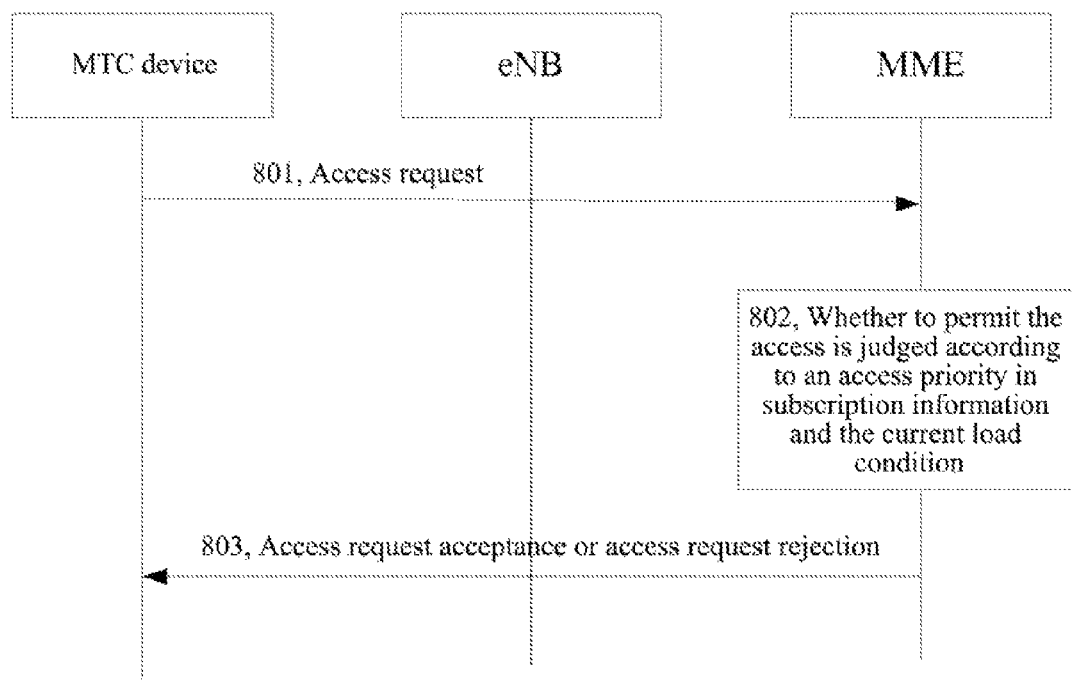
FIG. 8 is a flow diagram according to the example 6 of the present invention.

A network side allocates access priorities to an MTC device, an MTC device group or an MTC service type respectively according to a policy of the network side or service demands of MTC users, and takes the access priorities as subscription information to be saved in an HSS. In an attachment process of the MTC device, an MME acquires the subscription information from the HSS and saves the subscription information. After receiving an access request message sent by the MTC device, according to the access priorities in the saved MTC device subscription information and the current network load condition, a network side node can determine whether to reject an access request of the MTC device or not. The specific flow is as shown in FIG. 8, which includes the following steps.

In step 801, the MTC device sends the access request to the MME, and a device identifier is included in the message.

In step 802, the MME finds the MTC device subscription information saved by the MME through the device identifier, and according to the current network load condition and the access priorities in the subscription information, it decides whether to permit the access of the MTC device.

In step 803, the MME sends an access request acceptance message or an access request rejection message to the MTC device.

In another example of the present invention, it doesn't take the access priority of the MTC device as the subscription information to save, but configure the access priority of the MTC device in the MTC device and include the access priority of the MTC device in the access request, and the MME acquires the access priority from the access request.

In another example of the present invention, when receiving the access request, according to the current network load and the access priority of the MTC device, the eNB also can judge whether to permit the access of the MTC device, and at the point, the access priority of the MTC device is configured on the MTC device and the access priority of the MTC device is included in the access request.

In another example of the present invention, the MME also can configure the access control parameters according to the access priorities and the current network load, and after receiving the access request, whether to permit the access of the MTC device is judged according to the access control parameters and the access priorities.

Relative to the method for judging whether to permit the access of the MTC device according to an MTC device identifier or a group identifier in the related art, the method 2 is comparatively more simple, and the number of access priorities is relatively limited, and the number of MTC device identifiers or group identifiers is comparatively large, which needs more resource consumptions for performing access judgment.

In the method of the present invention, the MTC device decides whether the access request can be initiated according to an indication of the received access priority and access control parameter, which can reduce unnecessary control signaling interaction between the MTC device and the network side effectively and save network resources. Meanwhile, a method for dividing the access priority is introduced, which can simplify the process of a network node deciding the access control, and reduce the amount of information required to be transmitted in a control signaling message to a certain degree.

INDUSTRIAL APPLICABILITY

Compared with the related art, in the present invention, unnecessary control signaling interaction between the MTC device and the network side can be reduced effectively and network resources can be saved. Meanwhile, a method for dividing the access priority is introduced in the present invention, which can simplify the process of a network node deciding the access control, and reduce the amount of information required to be transmitted in a control signaling message to a certain degree.

What is claimed is:

1. A method for controlling access of machine communications, comprising:
   configuring an access priority for a machine type communications device;
   a network side configuring an access control parameter for an access priority needing an access control according to current network load information, and sending the access priority needing the access control and the access control parameter to the machine type communications device; and
   according to the access priority of the machine type communications device and the received access priority needing the access control and the access control parameter, the machine type communications device judging whether an access request can be initiated,
   wherein,
   the network side comprises a mobility management entity and an eNB;
   the step of a network side configuring an access control parameter for an access priority needing an access control according to current network load information comprises;
   the mobility management entity configuring the access control parameter of the access priority needing the access control according to the current network load information and a network policy, and sending the access priority needing the access control and/or the access control parameter to the eNB; or,
   the mobility management entity sending the current network load information to the eNB, and the eNB configuring the access control parameter of the access priority needing the access control according to the current network load information and the network policy.

2. The method according to claim 1, wherein, the step of configuring an access priority for a machine type communications device comprises: configuring the access priority of the machine type communications device in the machine type communications device locally.

3. The method according to claim 1, wherein, the access priority of the machine type communications device is configured according to differences of the machine type communications device, a machine type communications device group or a machine type communications service type.

4. The method according to claim 1, wherein, the access priority needing the access control comprises an access priority needing access prohibition and/or an access priority needing access delay.

5. The method according to claim 1, wherein, the access control parameter comprises one or a combination of following information: access probability, waiting time and access permitted or not.

6. The method according to claim 1, wherein,
   the current network load information is current service load information;
   the method further comprises: a serving gateway sending the current service load information to the mobility management entity, wherein, the serving gateway generates the current service load information according to a local service load condition, or generates the current service load information according to the local service load condition and a service load condition acquired from a packet data network gateway.

7. The method according to claim 1, wherein, the access priority needing the access control and the access control parameter are sent to the machine type communications device through a broadcast message,
   preferably,
   the access priority needing the access control and the access control parameter are carried through a system information block 2 or a newly added system information block in the broadcast message.

8. A method for controlling access of machine communications, comprising:
   configuring an access priority for a machine type communications device; and
   when receiving an access request of the machine type communications device, a network side network element performing access control on the machine type communications device according to the access priority of the machine type communications device and current network load information,
   wherein,
   the network side network element is a mobility management entity or an eNB; and
   the step of the network side network element performing access control on the machine type communications device according to the access priority of the machine type communications device and current network load information comprises:
   the network side network configuring an access control parameter for an access priority needing an access control according to the current network load information and a network policy; and
   when receiving the access request, performing access control on the machine type communications device according to the access control parameter and the access priority of the machine type communications device.

9. The method according to claim 8, wherein, the network side network element is a mobility management entity;
   the method further comprises: the mobility management entity acquiring the access priority of the machine type communications device from subscription information of the machine type communications device, or, the access request including the access priority of the machine type communications device, and the mobility management entity acquiring the access priority of the machine type communications device from the access request.

10. The method according to claim 8, wherein, the network side network element is an eNB, and the access request includes the access priority of the machine type communications device;
   the method further comprises: the eNB acquiring the access priority of the machine type communications device from the access request, and acquiring the current network load information from the mobility management entity.

11. The method according to claim 8, wherein, the access priority of the machine type communications device is configured according to differences of the machine type communications device, a machine type communications device group or a machine type communications service type.

12. A system for controlling access of machine communications, comprising: a machine type communications device and a network side, wherein:
the machine type communications device is configured to: after receiving an access priority needing an access control and an access control parameter corresponding to the access priority needing the access control sent by the network side, judge whether an access request can be initiated according to an access priority of the machine type communications device;
the network side is configured to: configure the corresponding access control parameter for the access priority needing the access control according to current network load information, and send the access priority needing the access control and the access control parameter to the machine type communications device,
the network side comprises a mobility management entity and an eNB; wherein:
the mobility management entity is configured to: configure the access control parameter corresponding to the access priority needing the access control according to the current network load information and a network policy, and send the access priority needing the access control and/or the access control parameter to the eNB; or,
the mobility management entity is configured to: send the current network load information to the eNB; the eNB is configured to: according to the current network load information and the network policy, configure the access control parameter corresponding to the access priority needing the access control.

13. The system according to claim 12, wherein, the access priority of the machine type communications device is configured according to differences of the machine type communications device, a machine type communications device group or a machine type communications service type.

14. The system according to claim 12, wherein, the access priority needing the access control is an access priority needing access prohibition and/or an access priority needing access delay.

15. The system according to claim 12, wherein,
the current network load information is current service load information;
the mobility management entity is further configured to: acquire the current service load information from a serving gateway, wherein, the current service load information is generated by the serving gateway according to a local service load condition, or is generated by the serving gateway according to the local service load condition and a service load condition acquired from a packet data network gateway.

16. The system according to claim 12, wherein, the network side is configured to: send the access priority needing the access control and the access control parameter to the machine type communications device through a broadcast message,
preferably,
the network side is configured to: carry the access priority needing the access control and the access control parameter through a system information block 2 or a newly added system information block in the broadcast message.

17. A network side network element, configured to:
when receiving an access request of a machine type communications device, perform access control on the machine type communications device according to an access priority of the machine type communications device and current network load information,
wherein
the network side network element is a mobility management entity or an eNB; and
the network side network element is further configured to:
configure an access control parameter for an access priority needing an access control according to the current network load information and a network policy; and
when receiving the access request, perform access control on the machine type communications device, according to the access control parameter and the access priority of the machine type communications device.

18. The network side network element according to claim 17, wherein, the network side network element is a mobility management entity;
the mobility management entity is further configured to: acquire the access priority of the machine type communications device from subscription information of the machine type communications device, or acquire the access priority of the machine type communications device from the access request;
or
the network side network element is an eNB;
the eNB is further configured to: acquire the access priority of the machine type communications device from the access request, and acquire the current network load information from a mobility management entity.

* * * * *